May 25, 1954 — W. F. HOWARD — 2,679,125
CRAB TRAP

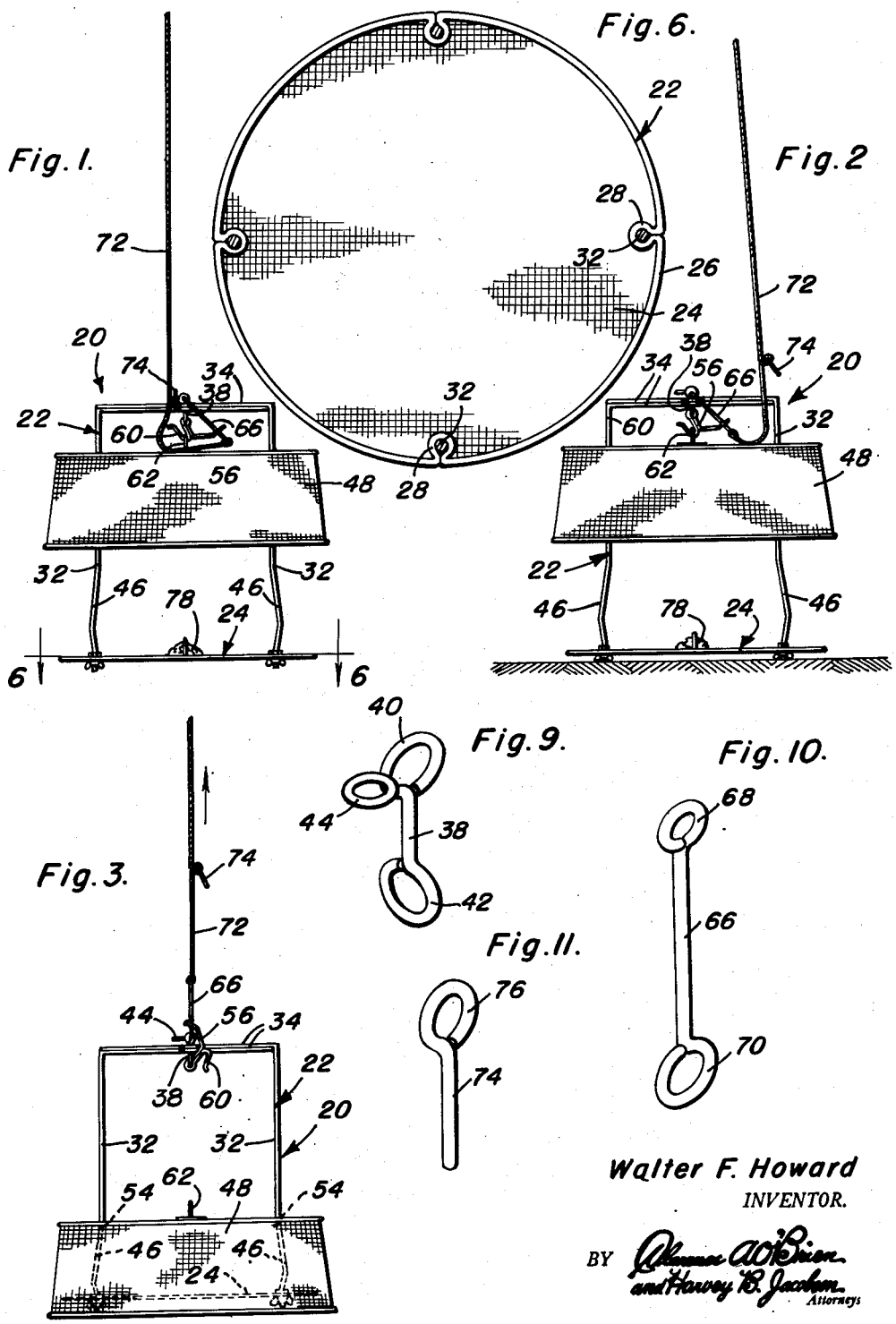

Filed April 10, 1952 — 2 Sheets-Sheet 2

Walter F. Howard
INVENTOR.

BY *Clarence A. O'Brien*
*and Harvey B. Jackson*
Attorneys

Patented May 25, 1954

2,679,125

UNITED STATES PATENT OFFICE 2,679,125

CRAB TRAP

Walter F. Howard, Wilmington, Del.

Application April 10, 1952, Serial No. 281,503

3 Claims. (Cl. 43—102)

This invention relates to new and useful improvements and structural refinements in crab traps, and the principal object of the invention is to provide a trap which may be conveniently lowered into water, easily and dependably tripped to trap a crab or crabs therein, and which may subsequently be raised out of the water, emptied and expeditiously reset.

An important feature of the invention resides in the provision of unique means for sustaining the trap in its open position while it is being lowered into the water, then conditioning the sustaining means for tripping, and tripping means for releasing the sustaining means, these various means being coordinated in such manner that a single cable is used for holding the trap and actuating the same.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention while it is being lowered into the water;

Figure 2 is a side elevational view thereof in condition for tripping;

Figure 3 is a side elevational view of the trip device in readiness for raising;

Figure 6 is a sectional view, taken substantially in the plane of the line 6—6 of Figure 1;

Figure 9 is a perspective view of an eye unit;

Figure 10 is a perspective view of a tripping link;

Figure 11 is a perspective view of a setting pin; and

Like characters of reference are employed to designate like parts in the specification and throughout the several views.

Figure 4:
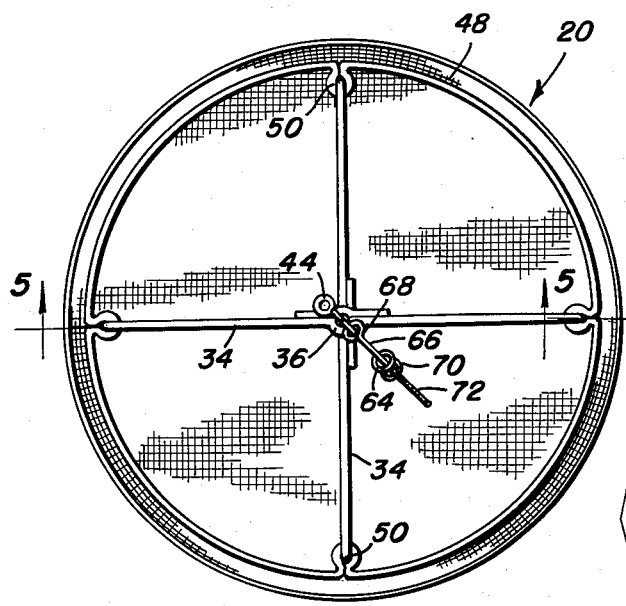
Figure 4 is a top plan view of the invention on an enlarged scale.
Figure 12:
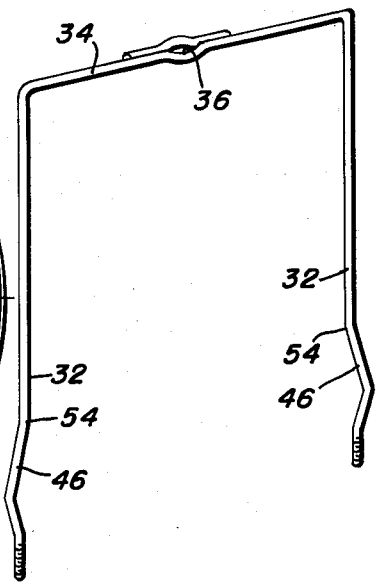
Figure 12 is a perspective view of a portion of the trap frame.

Referring now to the accompanying drawings in detail, the invention consists of a crab trap which is designated generally by the reference character 20 and embodies in its construction a frame 22 including a circular, foraminous bottom 24 provided with a marginal rim 26 having a plurality of spaced eyes 28 thereon, these eyes having secured therein by suitable nuts 30, 31 the lower extremities of pairs of upstanding side members 32 of the frame.

The side members 32 in each pair have parallel upper portions connected together by a transverse top member 34 which is provided intermediate the ends thereof with an eye 36, and the several top members of the frame cross each other and are connected together by an intermediate shank portion 38 of an eye piece (see Figure 9) which is provided at its upper and lower ends with a pair of vertically disposed eyes 40, 42. Moreover, the upper eye 40 has secured to one side thereof a horizontally disposed eye 44, the purpose of which will be hereinafter described.

Figure 5:
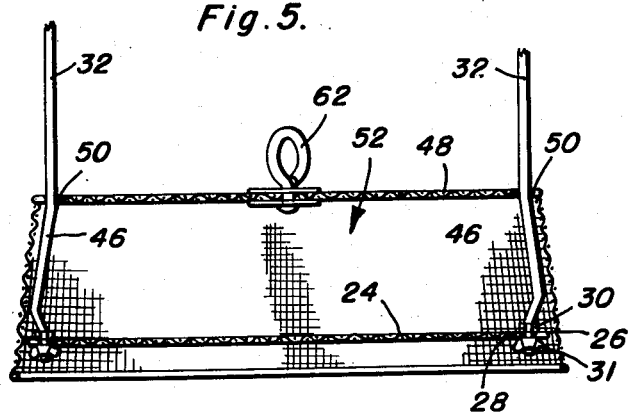
Figure 5 is a vertical sectional view showing the cover in released position, taken substantially in the plane of the line 5—5 of Figure 4 and with the upper portion of the trap omitted.

The aforementioned side members 32 have mutually divergent lower portions 46 and an inverted cup-shaped cover 48 of foraminous material is provided in the top thereof with apertures 50 to slidably receive the parallel upper portions of the side members 32, whereby the entire cover may be shifted from a raised, open position shown in Figures 1 and 2 to a lowered, closed position shown in Figures 3 and 5, wherein the cover coacts with the bottom 24 to provide an enclosure 52.

It will be noted that the angulations between the parallel upper portions of the side members 32 and divergent lower portions 46 thereof constitute what may be referred to as stops 54 which are engaged by the eyes 50 of the cover 48 when the cover is in its lowered position. The cover has a truncated side wall so as to fully receive the bottom 24 therein and thereby prevent any possibility of the crabs lifting the cover and escaping.

Figure 8:
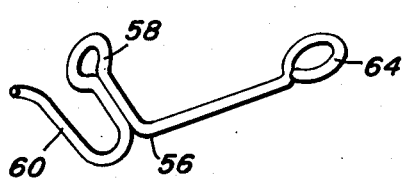
Figure 8 is a perspective view of the suspension member.

Means are provided for sustaining the cover 48 in its raised position, these means consisting of a sustaining member 56 (see Figure 8) which is preferably formed from wire and is provided intermediate the ends thereof with a loop 58, swingably attached to the aforementioned eye 42. The member 56 also includes a hook 60 which is engageable with an eye 62 on the top wall of the cover 48, while the remaining end of the member 56 is equipped with an eye 64.

An intermediate portion or shank of a tripping link 66 is slidable in the eye 64, this link being provided at the opposite ends thereof with a pair of eyes 68, 70 (see Figure 10), the eye 68 being movably connected to the aforementioned eye 40, while the eye 70 is connected to the extremity of an actuating cable 72.

Figure 7:
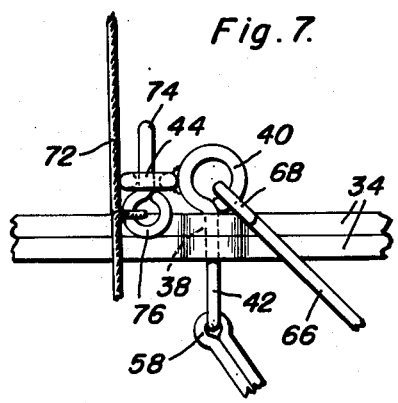
Figure 7 is a fragmentary elevational detail, illustrating components of the sustaining, conditioning and tripping means used in the invention.

Finally, the invention embodies in its construction a setting pin 74 (see Figure 11) which is provided at one end thereof with an eye 76 for securing to an intermediate portion of the cable 72, the pin 74 being receivable, in an inverted position, in the aforementioned eye 44, as is best shown in Figure 7.

Having thus described the construction of the invention, the operation thereof will now be explained.

Before the trap is lowered into the water, suitable bait 78 is positioned on the bottom 24 and the cover 48 is sustained in its raised position by engaging the hook 60 with the eye 62 as shown in Figure 1. The setting pin 74 is inserted in the eye 44 and when the trap is lowered into the water by means of the cable 72, the pin 74, engaging the eye 44, will sustain the entire weight of the trap. Under such circumstances, the portion of the cable 72 between the pin 74 and the link 66 will be slack as shown in Figure 1, and the link 66 itself will extend downwardly as shown under the influence of gravity.

When the trap has reached the bottom, slackening of the entire cable 72 will permit the pin 74 to drop out of the eye 44, thus conditioning the suspension member 56 for tripping as shown in Figure 2.

When a crab approaches the bait 78 on the bottom 24, the cable 72 is pulled upwardly, which will swing the link 66 upwardly about the eye 40 and the member 56 itself will be swung upwardly so that the hook 60 thereof is disengaged from the eye 62 as shown in Figure 3. This will automatically permit the cover 48 to slide downwardly on the side members 32 so as to trap the crab on the bottom 24. Then, continued upward pulling action of the cable 72 will raise the entire trap to the surface.

It is to be noted that by virtue of its construction as described, the entire trap may be readily disassembled and easily transported or stored in a comparatively small space when it is not in use.

It is believed that the advantages and use of the invention will be readily understood from the foregoing disclosure and, accordingly, further description thereof at this point it deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A crab trap comprising a frame including a bottom, upstanding side members and a top section, a cover slidable on said side members from a raised open position to a lowered closed position wherein it coacts with said bottom to form an enclosure, a sustaining member movably connected to said top section and including a hook releasably engaging said cover to hold the latter in its raised position, a trip link movably connected to said top section and having a free outer end, said sustaining member slidably engaging said link whereby said hook may be released from said cover when the link is raised, a cable connected to the free end of said link, an eye provided on said top section, and a setting pin secured to an intermediate portion of said cable and releasably engaging said eye, said cable having a slack portion between said pin and said link, whereby the link may be sustained in a lowered position.

2. In a crab trap, a bottom, spaced upstanding rods rising from said bottom, a transverse top interconnecting the upper ends of said rods, a cover slidably disposed on said rods for movement from said transverse top toward said bottom to enclose said bottom, said transverse top having eye means thereon, an eye piece received in said eye means, a cable, a link interconnecting the upper end of said eye piece to said cable, a hook suspended from the lower end of said eye piece and suspending said cover above said bottom, and a rigid sustaining member projecting laterally from said hook and slidably embracing said link, said link being swingable from a position disposed diagonally downward from eye-piece to a position above said eye-piece, whereby upward movement of said cable will swing said link to tilt said hook and release said cover.

3. The combination of claim 2 including a pin secured to said cable, and means on said eye-piece receiving said pin to retain said cable adjacent said eye piece prior to release of the cover from the hook.

References Cited in the file of this patent

UNITED STATES PATENTS

| Number | Name | Date |
|---|---|---|
| 99,537 | Cole | Feb. 8, 1870 |
| 104,570 | Fox | June 21, 1870 |
| 106,858 | Newton | Aug. 30, 1870 |
| 916,677 | Culverhouse | Mar. 30, 1909 |
| 1,564,147 | Stickley et al. | Dec. 1, 1925 |
| 2,489,856 | Buford | Nov. 29, 1949 |

FOREIGN PATENTS

| Number | Country | Date |
|---|---|---|
| 21,292 | Great Britain | 1895 |